United States Patent
Dixon et al.

(10) Patent No.: US 10,426,176 B2
(45) Date of Patent: Oct. 1, 2019

(54) VERTICAL ELECTRIC COOKER AND SMOKER AND SMOKE BOX

(71) Applicant: W.C. BRADLEY CO., Columbus, GA (US)

(72) Inventors: William A. Dixon, Columbus, GA (US); Sleiman Assaad Adallah, Columbus, GA (US); Mark Stephen McQuagg, Midland, GA (US)

(73) Assignee: W.C. BRADLEY CO., Columbus, GA (US)

( * ) Notice: Subject to any disclaimer, the term of this patent is extended or adjusted under 35 U.S.C. 154(b) by 537 days.

(21) Appl. No.: 15/075,813

(22) Filed: Mar. 21, 2016

(65) Prior Publication Data

US 2017/0020148 A1    Jan. 26, 2017

Related U.S. Application Data

(60) Provisional application No. 62/138,002, filed on Mar. 25, 2015.

(51) Int. Cl.
*A23B 4/056* (2006.01)
*A23B 4/052* (2006.01)
(Continued)

(52) U.S. Cl.
CPC .............. *A23B 4/056* (2013.01); *A23B 4/048* (2013.01); *A23B 4/052* (2013.01); *A23B 4/0523* (2013.01);
(Continued)

(58) Field of Classification Search
CPC ......... A23B 4/044; A23B 4/056; A23B 4/048; A23B 4/052; A23B 4/0523; A47J 37/0629; A47J 37/0709
(Continued)

(56) References Cited

U.S. PATENT DOCUMENTS 1,158,986 A    11/1915   Cronwall
1,399,704 A    12/1921   Eida
(Continued)

FOREIGN PATENT DOCUMENTS

CN    1240910    1/2000
DE    10215 688 A1    6/2003
(Continued)

OTHER PUBLICATIONS

Char-Broil, "Assembly Instructions for Models 6320, 6321 & 6323"; 1992, pp. 1-18.
(Continued)

*Primary Examiner* — Ibrahime A Abraham
*Assistant Examiner* — Chris Q Liu
(74) *Attorney, Agent, or Firm* — Dennis D. Brown; Brown Patent Law, P.L.L.C.

(57) ABSTRACT

A vertical electric cooker and smoker having lower air intake vents and upper exhaust vents which together create a more balanced flow and distribution of smoke and reduce the operating pressure of the system to allow a much larger load of wood chips to be used without refilling. A smoke box is also provided for holding and properly combusting the larger quantity of wood chips in an oxygen deficient environment. The smoke box has a false bottom and discharges the smoke through a circuitous exhaust flow path. Also, the electric heating elements of the cooking and smoking apparatus are contained in an assembly which provides an air gap beneath the smoker box and also shields the smoker box to prevent the wood chips in the smoker box from becoming overheated.

12 Claims, 7 Drawing Sheets

(51) Int. Cl.
*A23B 4/048* (2006.01)
*A47J 37/06* (2006.01)

(52) U.S. Cl.
CPC ....... *A47J 37/0629* (2013.01); *A23V 2002/00* (2013.01)

(58) Field of Classification Search
USPC ......... 99/352, 425, 444, 445, 446, 467, 473, 99/481, 482
See application file for complete search history.

(56) References Cited

U.S. PATENT DOCUMENTS

| | | | |
|---|---|---|---|
| 2,001,615 A | 5/1935 | William | |
| 3,155,814 A | 11/1964 | Appleman et al. | |
| 3,245,458 A | 4/1966 | Patrick et al. | |
| 3,277,948 A | 10/1966 | Best | |
| 3,437,415 A | 4/1969 | Davis et al. | |
| 3,517,602 A | 6/1970 | Horton | |
| 3,561,902 A | 2/1971 | Best | |
| 3,586,825 A | 6/1971 | Hurley | |
| 3,663,798 A | 5/1972 | Speidel et al. | |
| 3,683,058 A | 8/1972 | Partiot | |
| 3,788,301 A | 1/1974 | Terry | |
| 3,941,117 A | 3/1976 | Pei et al. | |
| 4,024,839 A | 5/1977 | Reid, Jr. et al. | |
| 4,039,275 A | 8/1977 | McGettrick | |
| 4,057,670 A | 11/1977 | Scheidler | |
| 4,140,100 A | 2/1979 | Ishihara | |
| 4,207,456 A | 6/1980 | Best | |
| 4,235,023 A | 11/1980 | Best | |
| 4,276,869 A | 7/1981 | Kern | |
| 4,307,659 A * | 12/1981 | Martin ................... | A47J 37/06 99/444 |
| 4,321,857 A | 3/1982 | Best | |
| 4,375,802 A | 3/1983 | Wallasvaara | |
| 4,403,541 A | 9/1983 | Berger | |
| 4,403,597 A | 9/1983 | Miller | |
| 4,426,792 A | 1/1984 | Best | |
| 4,437,833 A | 3/1984 | Mertz | |
| 4,508,097 A | 4/1985 | Berg | |
| 4,537,492 A | 8/1985 | Lein et al. | |
| 4,546,553 A | 10/1985 | Best | |
| 4,569,657 A | 2/1986 | Laspeyres | |
| 4,575,616 A | 3/1986 | Bergendal | |
| 4,606,261 A | 8/1986 | Bernardi | |
| 4,715,356 A | 12/1987 | Reynolds | |
| 4,785,552 A | 11/1988 | Best | |
| 4,798,192 A | 1/1989 | Maruko | |
| 4,839,502 A | 6/1989 | Swanson et al. | |
| 4,883,423 A | 11/1989 | Holowczenko | |
| 4,886,044 A | 12/1989 | Best | |
| 4,889,972 A | 12/1989 | Chang | |
| 4,909,137 A | 3/1990 | Brugnoli | |
| 4,934,260 A * | 6/1990 | Blevins .................. | A23B 4/052 126/21 A |
| 4,960,977 A | 10/1990 | Alden | |
| 4,979,436 A | 12/1990 | McGowan | |
| 5,024,209 A | 6/1991 | Schaupert | |
| 5,028,760 A | 7/1991 | Okuyama | |
| 5,062,408 A | 11/1991 | Smith et al. | |
| 5,062,788 A | 11/1991 | Best | |
| 5,111,803 A | 5/1992 | Barker et al. | |
| 5,218,952 A | 6/1993 | Neufeldt | |
| 5,230,161 A | 7/1993 | Best | |
| 5,240,411 A | 8/1993 | Abalos | |
| 5,277,106 A | 1/1994 | Raymer et al. | |
| 5,279,277 A | 1/1994 | Barker | |
| 5,306,138 A | 4/1994 | Us | |
| 5,313,877 A | 5/1994 | Holland | |
| 5,320,086 A | 6/1994 | Beal et al. | |
| 5,322,007 A | 6/1994 | Caridis et al. | |
| 5,363,567 A | 11/1994 | Best | |
| 5,488,897 A | 2/1996 | Snyder | |
| 5,494,003 A | 2/1996 | Bartz et al. | |
| 5,509,403 A | 4/1996 | Kahlke et al. | |
| 5,513,623 A | 5/1996 | Hong | |
| 5,566,607 A | 10/1996 | Schleimer | |
| 5,567,459 A | 10/1996 | Gonzalez-Hernandez et al. | |
| 5,571,009 A | 11/1996 | Stalhane et al. | |
| 5,582,094 A | 12/1996 | Peterson et al. | |
| 5,588,355 A * | 12/1996 | Mead ..................... | A23B 4/052 99/449 |
| 5,594,999 A | 1/1997 | Best | |
| 5,599,471 A | 4/1997 | Zaidman | |
| 5,676,043 A | 10/1997 | Best | |
| 5,711,661 A | 1/1998 | Kushch et al. | |
| 5,761,990 A | 6/1998 | Stewart et al. | |
| 5,782,165 A * | 7/1998 | Glenboski ............. | A47J 27/004 219/401 |
| 5,782,166 A | 7/1998 | Lin | |
| 5,823,099 A | 10/1998 | Ko | |
| 5,879,154 A | 3/1999 | Suchovsky | |
| 5,890,422 A | 4/1999 | Clark et al. | |
| 5,909,533 A | 6/1999 | Kitabayashi et al. | |
| 5,989,013 A | 11/1999 | Gray | |
| 6,035,770 A | 3/2000 | Witefield | |
| 6,114,666 A | 9/2000 | Best | |
| 6,159,001 A | 12/2000 | Kushch et al. | |
| 6,190,162 B1 | 2/2001 | Smith et al. | |
| 6,205,996 B1 | 3/2001 | Ryan | |
| 6,461,150 B1 | 10/2002 | Sirand | |
| 6,657,168 B1 | 12/2003 | Lazzer | |
| 6,761,160 B1 | 7/2004 | Haygood | |
| 6,779,519 B2 | 8/2004 | Harneit | |
| 6,783,226 B2 | 8/2004 | Szlucha | |
| 7,202,447 B2 | 4/2007 | Kingdon et al. | |
| 7,219,663 B2 | 5/2007 | Cuomo | |
| 7,426,885 B2 | 9/2008 | McLemore | |
| D615,798 S | 5/2010 | McLemore | |
| D616,243 S | 5/2010 | McLemore | |
| 7,726,967 B2 | 6/2010 | Best | |
| 8,074,634 B2 | 12/2011 | Best | |
| 8,227,728 B2 | 6/2012 | Best | |
| 2001/0036610 A1 | 11/2001 | Wood | |
| 2002/0020405 A1 | 2/2002 | Coleman et al. | |
| 2004/0011350 A1 | 1/2004 | Dowst et al. | |
| 2004/0060552 A1 | 4/2004 | Yamada et al. | |
| 2004/0152028 A1 | 8/2004 | Singh et al. | |
| 2004/0250688 A1 | 12/2004 | Farkas et al. | |
| 2005/0204934 A1 | 9/2005 | Robertson | |
| 2005/0226976 A1 | 10/2005 | Chung | |
| 2006/0003279 A1 | 1/2006 | Best | |
| 2006/0021517 A1 | 2/2006 | Best | |
| 2006/0042473 A1 | 3/2006 | Silvestrini | |
| 2006/0137543 A1 * | 6/2006 | McLemore ............ | A23B 4/052 99/482 |
| 2006/0266979 A1 | 11/2006 | Ra | |
| 2007/0125357 A1 | 6/2007 | Johnston | |
| 2007/0131234 A1 | 6/2007 | Moore | |
| 2008/0072890 A1 | 3/2008 | Best | |
| 2008/0121117 A1 | 5/2008 | Best | |
| 2008/0163765 A1 | 7/2008 | O'Shea | |
| 2011/0186561 A1 | 8/2011 | Ahmed | |
| 2012/0222665 A1 | 9/2012 | Ahmed | |
| 2012/0318254 A1 | 12/2012 | Howard | |
| 2013/0008427 A1 | 1/2013 | Ahmed | |
| 2014/0216268 A1 * | 8/2014 | Burch .................. | A23B 4/0523 99/352 |
| 2014/0216274 A1 * | 8/2014 | Ahmed ................ | A23B 4/0523 99/481 |
| 2015/0079250 A1 * | 3/2015 | Ahmed .................. | A23B 4/052 426/314 |

FOREIGN PATENT DOCUMENTS

| | | |
|---|---|---|
| EP | 0 221 686 | 10/1986 |
| EP | 1 028 292 A1 | 8/2000 |
| EP | 1 096 203 | 5/2001 |
| FR | 1 129 123 | 1/1957 |
| FR | 1 204 968 | 1/1960 |
| FR | 1387132 | 1/1965 |
| FR | 70 02058 | 9/1971 |

(56) References Cited

FOREIGN PATENT DOCUMENTS

| | | |
|---|---|---|
| FR | 2076610 | 10/1971 |
| FR | 2472141 | 12/1980 |
| GB | 23552 | 3/1915 |
| GB | 432481 | 12/1933 |
| GB | 562136 | 6/1944 |
| GB | 576377 | 4/1946 |
| GB | 1029774 | 7/1963 |
| GB | 1339345 | 12/1973 |
| GB | 2 362 451 | 11/2001 |
| GB | 2 409 265 | 6/2005 |
| JP | 2000 121064 | 4/2000 |
| JP | 2004 179089 | 6/2004 |
| WO | WO 2004103133 A1 | 12/2004 |
| WO | WO 2006080949 A2 | 8/2006 |
| WO | WO 2008125258 A2 | 10/2008 |

OTHER PUBLICATIONS

"Cross Section of G-Series Burner System"; Sep. 4, 2001; Publisher: Thermal Engineering Corp., Columbia, SC; Published in: US.

P. Sheridan, et al., "Application of Far Infra-Red Radiation to Cooking of Meat Products"; 1999; pp. 203-208, vol. 1, No. 3/4; Publisher: Journal of Food Engineering; Published in: US.

"Cross Section of G3000 Cabinet Unit"; Sep. 4, 2001; Publisher: Thermal Engineering Corp., Columbia, SC; Published in: US.

Sheridan, et al., "Analysis of Yield While Cooking Beefburger Patties Using Far Infrared Radiation"; 2002; pp. 3-11, vol. 51; Publisher: Journal of Food Engineering; Published in: US.

N.C. Shilton, et al., "Determination of the Thermal Diffusivity of Ground Beef Patties Under Infrared Radiation Oven-Shelf Cooking"; Mar. 2002; pp. 39-45 (Abstract Only), vol. 52, No. 1; Publisher: Journal of Food Engineering; Published in: US.

N. Shilton, et al., "Modeling of Heat Transfer and Evaporate Mass Losses During the Cooking of Beef Patties Using Far-Infrared Radiation"; 2002; pp. 217-222 (Abstract Only), vol. 55, No. 3; Publisher: Journal of Food Engineering; Published in: US.

Y. Takahashi, et al., "Impact of IR Broiling Onthe Thiamin and Riboflavin Retention and Sensory Quality of Salmon Steaks for Foodservice Use"; 1987; pp. 4-6 (Abstract Only), vol. 52, No. 1; Publisher: Journal of Food Science; Published in: US.

PCT/US2016/023419; International Search Report and Written Opinion; dated Jun. 28, 2016; Applicant: W.C. Bradley Co.; Published in: WO.

\* cited by examiner

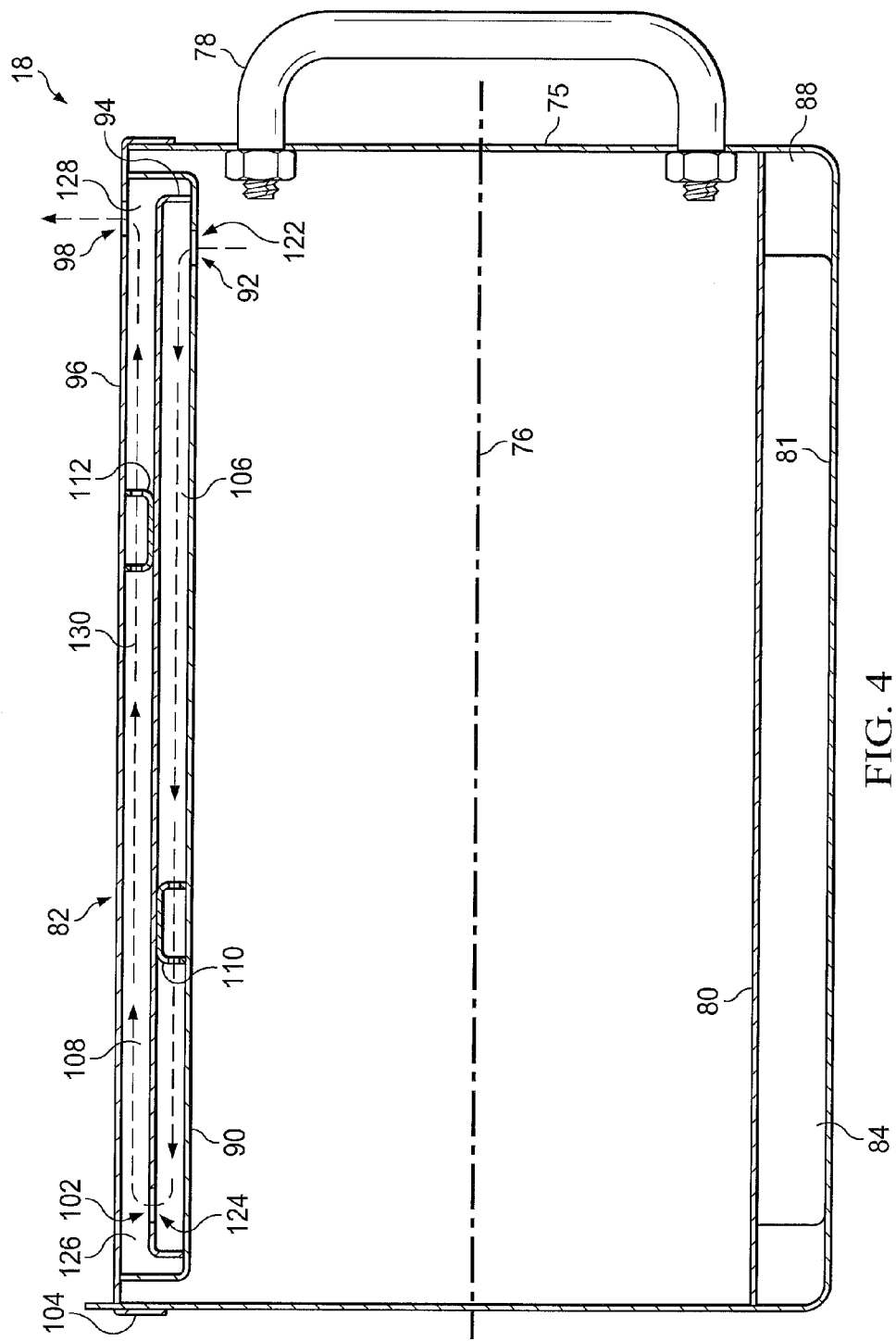

_US 10,426,176 B2_

VERTICAL ELECTRIC COOKER AND SMOKER AND SMOKE BOX

RELATED CASE

This application claims the benefit of U.S. Provisional Patent Application Ser. No. 62/138,002 filed on Mar. 25, 2015 and incorporates said provisional application by reference into this document as if fully set out at this point.

FIELD OF THE INVENTION

The present invention relates to vertical electric apparatuses for cooking and smoking and to smoke generation devices and systems for such apparatuses.

BACKGROUND OF THE INVENTION

A vertical electric smoker typically comprises: a vertical box-type cooking and smoking chamber; a vertical front door for the cooking chamber; and an internal electric element. The electrical element is typically used for both (a) heating the interior of the cooking chamber for cooking the food and (b) heating a small amount of wood (e.g., wood chips, pellets, or other pieces) to generate smoke within the cooking chamber. Often the vertical box will be built with insulated walls, a window in the door, and electronic controls, including a remote control in some cases. Also, a single exhaust vent is typically provided in or near the top of the vertical box to allow the smoke to flow out of the cooking chamber after contacting the food.

Examples of prior vertical electric smokers are shown in US Pat. Nos. D615798, D616243, and 7,426,885. In the vertical electric smoker of U.S. Pat. No. 7,426,885, wood chips are placed in a loading trough which is inserted through an opening in the side of the cooking chamber. In this arrangement, multiple small amounts of wood chips, typically limited to less than one cup, must be added during the course of the cooking and smoking process.

Consequently, when using a prior vertical electric smoker of the type shown in U.S. Pat. No. 7,426,885 for smoking multiple large pieces of food in the cooking chamber over a lengthy, slow cooking cycle, the user must frequently assess, typically by visual observation of the amount and color of the smoke flowing out of the cooking and smoking chamber, when a new load of wood chips is needed. Then, to add each new load of wood chips, the user must withdraw the wood loading trough, refill the trough with a small fresh load of wood chips, and reinsert the loading trough into the cooking chamber.

Because this reloading process may need to be repeated multiple times during a slow cooking and smoking cycle, a considerable amount of time and attention is required. Also, the amount of smoke generated within the cooking chamber is cyclical such that (a) the amount of smoke generated for at least several minutes prior to replacing a spent load of wood chips can be undesirably low and (b) little or no smoke will be initially generated for several minutes after a fresh load of wood chips is inserted.

To complete the entire cooking and smoking process without having to repeatedly replace the wood chips, the amount of wood chips placed in the cooking and smoking chamber at the beginning of the cooking cycle would have to be up to four times or more greater than the amount of wood chips currently used in each of the small individual loads. Unfortunately, however, placing such a large load of wood chips or pellets in close proximity to the electric heating element for the purpose of producing smoke will create various problems.

First, placing such a large amount of fuel in close proximity to the heat source can cause fires inside the cooking chamber. Second, even if the fire is suppressed, a higher rate of combustion will still be produced which will use up the wood more quickly while also generating more heat than smoke. Third, associated with the second problem, an undesirable amount of dense smoke can build up inside the cooking chamber and create an unfavorable cooking environment which can lead to, among other things, the excessive condensation of smoke and water vapor from the combustion process onto the relatively cold meat or other food products within the cooking and smoking chamber.

SUMMARY OF THE INVENTION

The present invention satisfies the needs and alleviates the problems discussed above.

In one aspect, a vertical, electrically-heated apparatus for cooking and smoking is provided wherein at least one air intake vent is provided in the lower portion of the cooking and smoking chamber of the apparatus and at least one exhaust vent is provided in the upper portion of the cooking and smoking chamber. Preferably, the apparatus comprises a pair of lower air intake vents on opposite sides of the cooking and smoking chamber and a pair of upper exhaust vents on opposite sides of the cooking and smoking chamber.

This inventive venting arrangement unexpectedly and surprisingly operates to: (a) create a balanced flow of ventilating air through the cooking and smoking chamber, thus providing a more even distribution of smoke and heat inside the chamber; (b) reduce the amount of $CO_2$ produced in the apparatus; (c) only slightly reduce the temperature in the cooking and smoking chamber for the first hour of operation, after which the temperature is comparable; (d) consistently produce a desired concentration of smoke which is not overly dark or dense; (e) reduce the amount of condensation of smoke and water vapor on the surface of the food; (f) reduce the operating pressure within the cooking and smoking chamber to allow a much larger load of wood chips to be placed in the apparatus; and (g) more evenly fill the chamber with smoke without any voids in the cooking and smoking zone.

In another aspect, an improved heating element assembly is provided comprising: (a) a tray which holds one or more electric heating elements for the cooking and smoking apparatus and (b) a smoke box retaining station. The retaining station receives the bottom of the smoke box (i.e., the container in which the wood chips or other wood pieces are held and burned to produce smoke) and holds the smoke box above the electric heating element(s). The retaining station preferably comprises: (a) a cover plate which at least partially covers the electric heating element(s) and acts as a bottom plate for the retaining station; (b) a plurality of spacers (stand-offs) projecting from the upper surface of the cover plate to create an air gap between the cover plate and the bottom of the smoke box; and (c) a reflector which extends rearwardly from the receiving station for shielding the back of the smoke box.

These features of the heating element assembly operate to (a) reduce the temperature and heat transfer at the bottom of the smoke box sufficiently to increase smoke time, (b) provide even heating of the wood chips in the entire lower layer inside the box so that the chips start at the same time, and (c) eliminate hot pockets within the smoke box.

In another aspect, an improved smoke box is provided for holding the wood chips or other pieces and slowly combusting the wood in an oxygen starved environment to produce wood smoke for use in the cooking and smoking chamber of the inventive apparatus. The smoke box has a false bottom which creates an internal gap in the container beneath the wood chips. In addition, either the lid of the smoke box, one or more vertical side walls of the box, or a combination thereof include(s) an exhaust flow assembly which defines a circuitous flow path wherein the smoke is required to flow through an inner flow gap (horizontal or vertical) and then change directions and flow through an outer flow gap (horizontal or vertical) as it travels to the smoke exhaust opening(s). Additionally, one or more obstructing structures (e.g., flow rail pieces with offset flow ports as discussed below) are preferably provided in each of the inner and outer flow gaps to cause the smoke to also change direction to at least some degree as it flows from one end of the flow gap to the other.

This circuitous path for discharging the smoke product from the smoke box acts as a flame suppression mechanism to prevent and contain any fire in the smoke box, and additionally provides for cooling and mixing of the smoke produced in the smoke box so that the discharged smoke product has a relatively uniform temperature and smoke concentration. The length of the circuitous path also allows for the smoke temperature to be hot enough to maintain suspension in the atmosphere but cool enough to stay well below any potential ignition point of the smoke when it exits from the smoke box.

Moreover, the beneficial features of the inventive smoke box operate together with the inventive venting arrangement for the cooking and smoking chamber and the novel features of the inventive heating element assembly to allow a sufficient amount of wood chips to be placed in the smoke box to complete the cooking and smoking operation without reloading.

In another aspect, there is provided an apparatus for cooking and smoking food comprising: (a) a vertically extending cooking and smoking chamber having a left side wall, a right side wall, a back wall, a front opening, and a bottom floor; (b) a door positionable on the front opening for closing and opening the front opening; (c) one or more air intake vents provided in a lower portion of the cooking and smoking chamber; (d) one or more exhaust vents provided in an upper portion of the cooking and smoking chamber; and (e) one or more electric heating elements positioned in the lower portion of the cooking and smoking chamber, the one or more electric heating elements being spaced above the bottom floor of the cooking and smoking chamber.

The apparatus preferably comprises two of the air intake vents and two of the exhaust vents wherein a first of the air intake vents is provide through a lower portion of the right side wall, a second of the air intake vents is provide through a lower portion of the left side wall, a first of the exhaust vents is provided through an upper portion of the right side wall, and a second of the exhaust vents is provided through an upper portion of the left side wall. The first and the second air intake vents are preferably located at an elevation which is at or below an elevation of the electric heating element. In addition, the cooking and smoking chamber has an uppermost food support rack positioned therein and the first and the second exhaust vents are preferably positioned at an elevation above an elevation of the uppermost food support rack in the cooking and smoking chamber.

The apparatus also preferably comprises (a) a smoke box for generating smoke and (b) a smoke box placement station in the cooking and smoking chamber for placement of the smoke box at least partially over the one or more electric heating elements. Preferably, the apparatus further comprises an element tray in which the one or more electric heating elements are positioned, the element tray being spaced above the bottom floor of the cooking and smoking chamber. In addition, the smoke box placement station preferably comprises (i) a cover plate on the element tray which at least partially covers the one or more electric heating elements and (ii) a plurality of spacing elements on an upper surface of the cover plate on which the smoke box is placeable to provide an air gap between a bottom of the smoke box and the cover plate.

The element tray of the apparatus also preferably has a reflective upper surface positioned beneath the one or more electric heating elements. Further, the apparatus preferably includes (a) an air gap between the element tray and the back wall of the cooking and smoking chamber and (b) a horizontal reflector plate extending rearwardly from the element tray toward the back wall of the cooking and smoking chamber which shields a vertical back side of the smoke box from radiant energy which is emitted from the one or more electric heating elements, reflected from the reflective upper surface of the element tray, or both.

In another aspect, there is provided a smoke box apparatus which can be used in the inventive smoker or can be used in other applications. The inventive smoke box apparatus preferably comprises: (a) a container having an interior combustion area for combusting wood chips or other pieces in an oxygen deficient environment to produce smoke and (b) an exhaust flow assembly which defines a circuitous exhaust flow path for the smoke wherein the smoke must flow in a first direction through an inner flow gap formed by the exhaust flow assembly and then must flow in a second direction, different from the first direction, through an outer flow gap formed by the exhaust flow assembly.

The container of the inventive smoke box also preferably has a false bottom which is positioned in the container at the bottom of the interior combustion area, the false bottom being spaced above the actual bottom of the container such that a bottom air space is defined between the false bottom and the actual bottom of the container.

In addition, the exhaust flow assembly of the inventive smoke box preferably further includes: (i) a first obstructing structure in the inner flow gap which at least momentarily alters the flow path of the smoke as the smoke travels from an inlet end to an outlet end of the inner flow gap and (ii) a second obstructing structure in the outer flow gap which at least momentarily alters the flow path of the smoke as the smoke travels from an inlet end to an outlet end of the outer flow gap. The first and the second obstructing structures preferably each comprise an upstream rail and a parallel downstream rail, the upstream and the downstream rails each have a plurality of holes for flow of the smoke through the rails wherein the holes of the downstream rail are preferably not in alignment with the holes of the upstream rail.

The exhaust flow assembly of the inventive smoke box can be formed in a lid of the container. As another alternative, the exhaust flow assembly can be formed in a vertical side wall of the container. As yet another alternative, the exhaust flow assembly can be formed in a plurality of vertical side walls of the container.

Further aspects, features, and advantages of the present invention will be apparent to those of ordinary skill in the art upon examining the accompanying drawings and upon reading the following detailed description of the preferred embodiments.

BRIEF DESCRIPTION OF THE DRAWINGS

FIG. 4 is a cutaway elevational side view of the inventive smoke box 18.

DETAILED DESCRIPTION OF THE PREFERRED EMBODIMENTS

Figure 1:
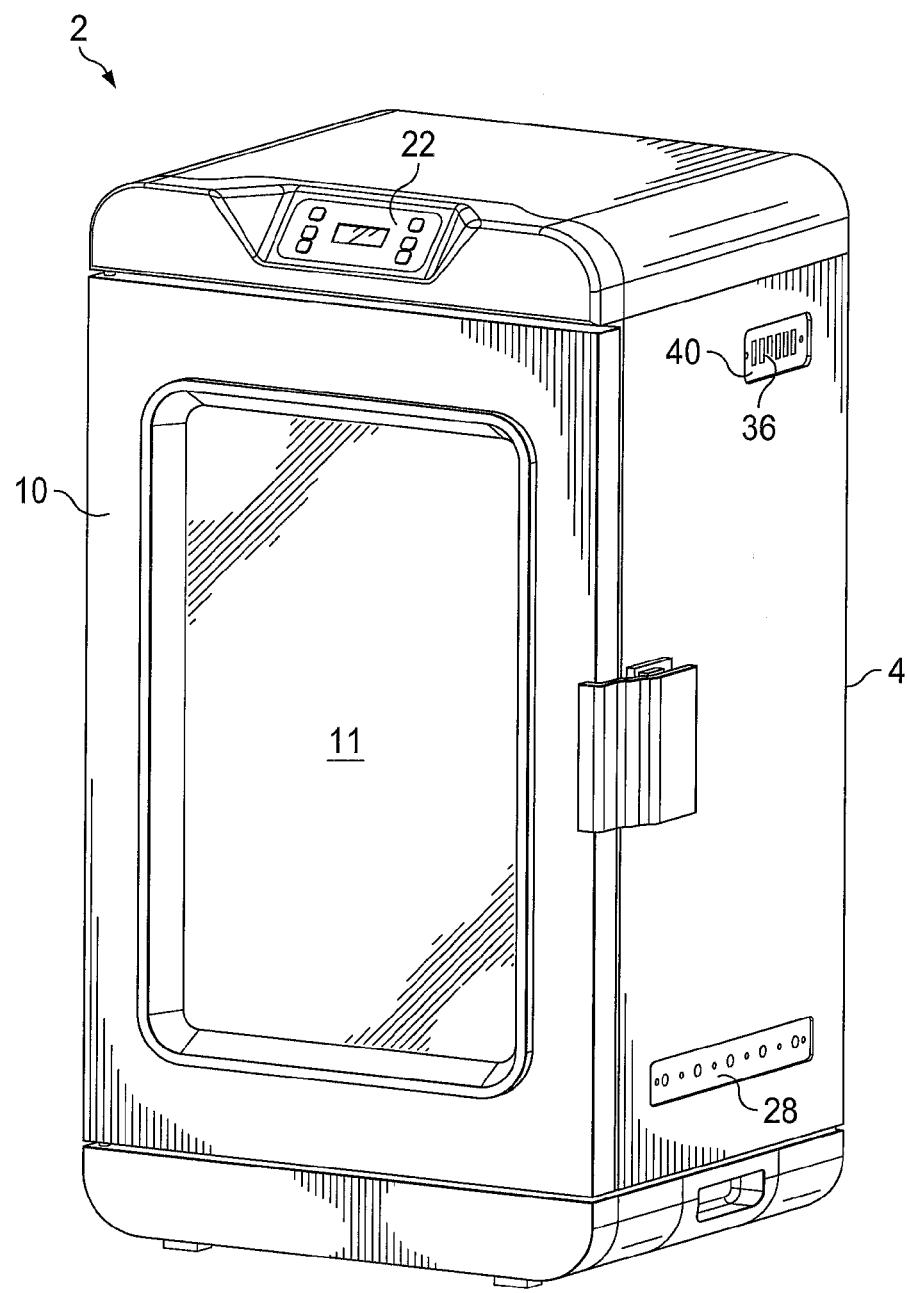
FIG. 1 is a perspective view of an embodiment 2 of the vertical electric cooking and smoking apparatus provided by the present invention.
Figure 2:
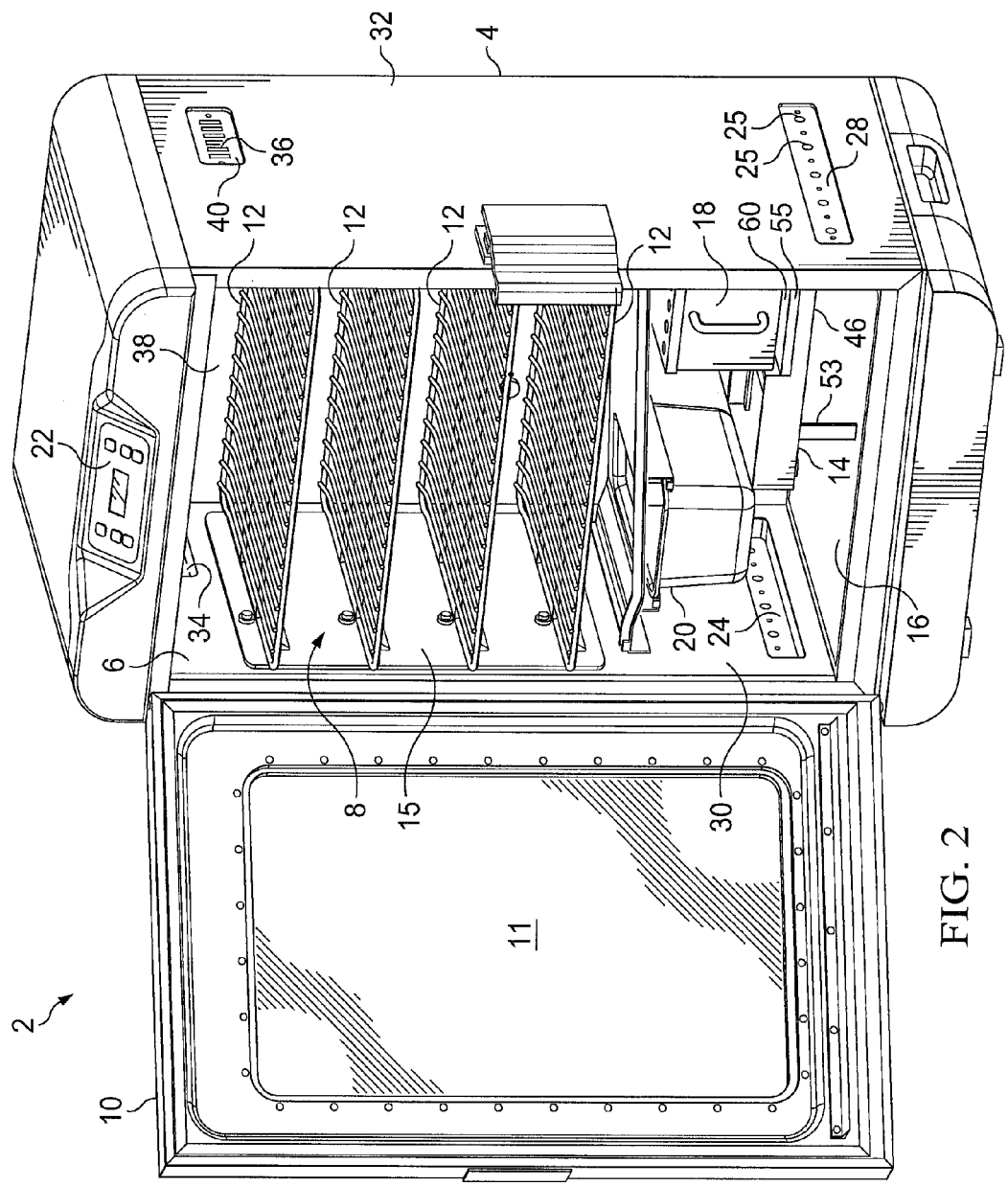
FIG. 2 is a perspective view of the inventive vertical electric cooker and smoker 2 with the door 10 in open position to show the interior of the apparatus 2.

An embodiment 2 of the vertical electric cooker and smoker provided by the present invention is shown in FIGS. 1 and 2. The inventive electric cooking and smoking apparatus 2 comprises: a vertical rectangular box 4 having a vertical front opening 6; a cooking and smoking chamber 8 within the vertical box 4; a vertical front door 10, preferably having a window 11 therein, which is pivotably attached to the vertical box 4 for opening and sealingly closing the front opening 6 of the cooking and smoking chamber 8; a plurality of food support racks 12 removably positionable in the cooking and smoking chamber 8; an electrical heating element assembly 14 spaced above the floor 16 of the cooking and smoking chamber 8; a smoke box 18 which is removably positionable on the heating element assembly 14; a removable pan or other container 20 adjacent to the heating element assembly 14 for holding water or other liquid to maintain a desired level of moisture or flavorant vapor in the cooking and smoking chamber 8; and an electronic display and control panel 22 at the top of the box 4 above the door 10 for controlling the electrical heating system and/or monitoring temperatures, cooking times, and/or other parameters within the cooking and smoking chamber 8 in any manner desired.

The multiple food support racks 12 will preferably be mounted on opposing stamped side plates 15, using common formations found in indoor ovens for retaining cooking racks. However, this stamped detail 15 is preferably not integral with the side wall of the cooking and smoking chamber 8 as would be normal in an indoor oven, but is more preferably attached as a separate part as depicted for additional flexibility in the manufacturing and configuration of the inventive apparatus 2.

As shown in FIGS. 1 and 2, two air intake vents 24 and 28 are provided in the lower portion of the cooking and smoking chamber 8. One of the lower air intake vents 24 is provided through the left side wall 30 of the vertical box 4 and the other air intake vent 28 is provided through the right side wall 32 of the vertical box 4, preferably directly opposite the left side intake vent 24. The air intake vents 24 and 28 are preferably located in the side walls 30 and 32 at or below the elevation of the heating element assembly 14.

Each of the side air intake vents 24 and 28 preferably comprises one opening (e.g., an elongate slot) or a series of openings 25 which (a) preferably extend(s) laterally in the side wall 30 or 32 of the vertical box 4 across at least 30% (more preferably across from about 75% to about 85%) of the width of the side wall 30 or 32 and (b) is preferably centered in the lower portion of the side wall 30 or 32. Proportionally speaking, the total flow (opening) area provided by each of the air intake vents 24 and 28 is preferably in the range of from about 1.0 to about 4.0 inches$^2$, more preferably from about 2.0 to about 3.0 inches$^2$, per 2.94 ft$^3$ of volume of the cooking and smoking chamber 8. Although it is preferred that the air intake vents 24 and 28 not be adjustable, the inventive apparatus 2 can optionally include louvers, sliding covers, or other features for selectively changing the open area of the intake vents 24 and 28.

As further shown in FIGS. 1 and 2, two exhaust vents 34 and 36 are provided in the upper portion of the cooking and smoking chamber 8, preferably near the top end thereof above the uppermost food support rack 12. Preferably, one of the upper exhaust vents 34 is provided through the left side wall 30 of the vertical box 4 and the other upper exhaust vent 36 is provided through the right side wall 32 of the vertical box 4, preferably directly opposite the left side exhaust vent 34.

Each of the exhaust vents 34 and 36 preferably (a) is located from about 1.5 to about 6.5 inches from the upper end of the cooking and smoking chamber 8, (b) is located within from about 2.5 to about 4.5 inches from the back wall 38 of the cooking and smoking chamber 8, (c) has a louvered exterior cover 40 which operates to direct smoke from the forward end 94 of the lid assembly 82 of the smoke box 18 up and through a plurality of food support racks 12, and (d) provides a total effective proportional flow area, through the cover 40 if present, in the range of from about 4.0 to about 9.0 inches$^2$, more preferably from about 6.0 to about 7.0 inches$^2$, per 2.94 ft$^3$ of volume of the cooking and smoking chamber 8.

The inventive placement of the lower pair of air intake vents 24 and 28 and the upper pair of exhaust vents 34 and 36 on each side of the cooking smoking chamber 8 creates a balanced flow of ventilating air through the cooking and smoking chamber 8 on both sides, thus providing a more even distribution of smoke and heat inside the chamber 8. The admission of cool, fresh outside air also reduces the production of $CO_2$, as shown in tests of the inventive apparatus 2. In these tests, over the space of the first two hours of operation, the exhaust from the inventive cooking and smoking chamber 8 had a $CO_2$ concentration of no more than 0.78%, normally between 0.10% and 0.15%. However, without the air intake vents 24 and 28, a $CO_2$ concentration of up to 2.25%, normally between 1.3% and 2.1%, was produced.

Moreover, these tests further showed that the cooling air flow provided by the inventive venting arrangement unexpectedly only slightly reduced the average internal temperature in the cooking and smoking chamber 8 for the first hour of operation, after which the temperatures were comparable. Although the reason for this surprising result is not known with certainty, it is believed to be the effect of the interior of the cooking and smoking chamber 8 as a whole reaching a radiant heat equilibrium state after an hour of operation with radiant energy becoming the dominant mode of heat transfer.

The visual effect of the use of the inventive venting arrangement with a large fuel load of the type discussed below was that the wood smoke did not become overly dark or dense, but retained the light grey-blue color desired. The inventive venting arrangement also reduced the amount of condensation of smoke and water vapor on the surface of the food during cooking.

In addition, the venting arrangement reduces the operating pressure within the cooking and smoking chamber 8 and therefore, in conjunction with the larger size and inventive design and structure of the smoke box 18 (discussed below), allows a much larger load (up to as much as four cups or more) of wood chips, pellets or other pieces to be used in the smoke box 18. Heretofore, in the prior single top vented electric smoker cabinets because of the build-up of pressure and unburned, flammable hydrocarbons caused by the partial combustion of, and the production of smoke from, the wood chips, the quantity of wood chips which could be used in the cabinet was only about ¾ of a cup or less.

Also, by providing lower air intake vents 24 and 28 and upper exhaust vents 34 and 36 on both sides of the cooking and smoking chamber 8 of the inventive apparatus 2, the cooking and smoking chamber 8 is more evenly filled with smoke without any voids in the cooking and smoking zone. The inventive venting arrangement additionally assists in directing the smoke upwardly through the food support racks 12, thereby uniformly contacting and covering the food products with the desired amount of smoke.

The improved electrical heating element assembly 14 used in the inventive vertical electric cooker and smoker 2 preferably comprises: a holding tray 46 having a reflective interior bottom surface 48; one or more electric heating elements 50 positioned in the tray 46 above the reflective bottom surface 48; a rear attachment bracket 52; and a plurality of bottom legs 53. The rear bracket 52 secures the heating element assembly 14 to the back wall 38 of the cooking and smoking chamber 8 and provides an air gap between the holding tray 46, and smoke box 18, and the back wall 38 of the chamber 8. The bottom legs 53 preferably space the holding tray 46 about 2.25 inches above the bottom 16 of the cooking and smoking chamber 8. Also, a pair of spacers 54 and 57 project from the side of the holding tray 46 for spacing the holding tray 46 and smoke box 18 from the interior surface of the right side wall 32 of the vertical box 4 to provide an air gap of about 0.40 inches.

Figure 3:
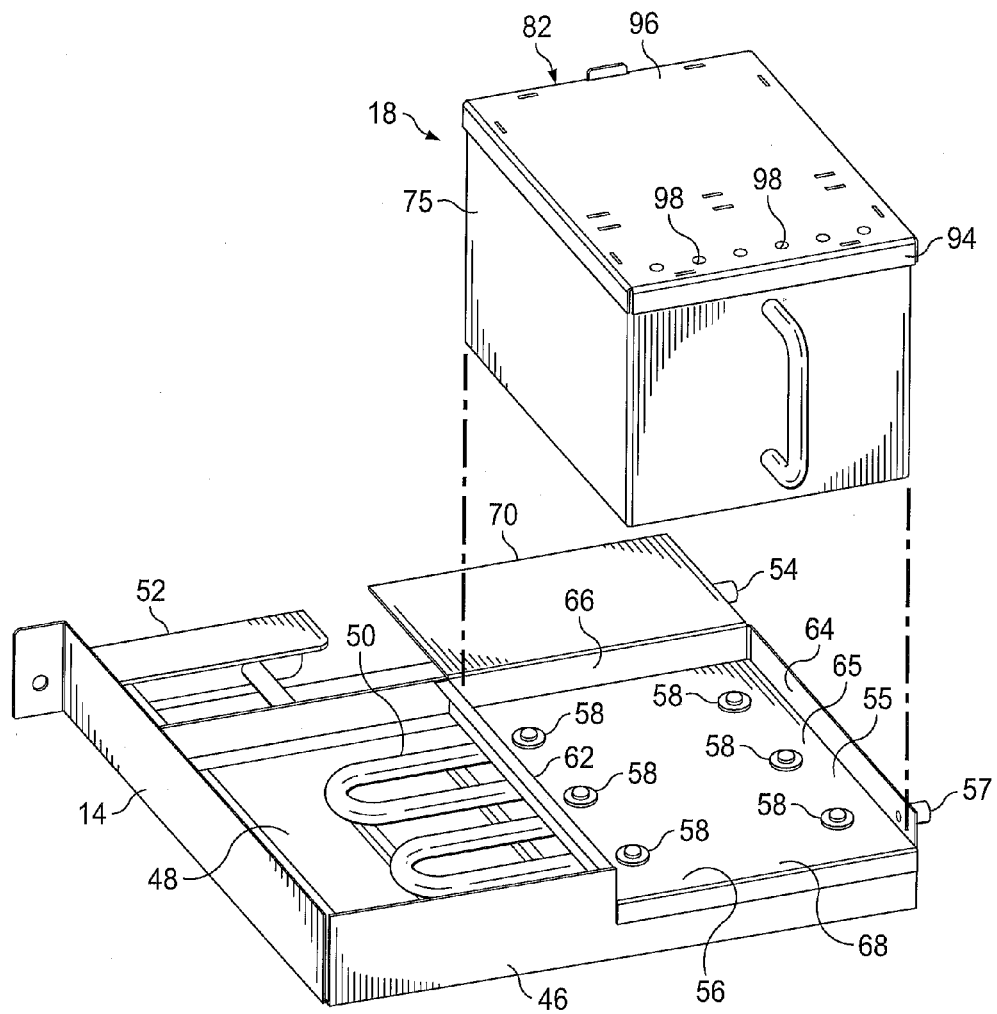
FIG. 3 is a perspective view of an electrical heating element assembly 14 and an embodiment 18 of the smoke box provided by the present invention.
Figure 5:
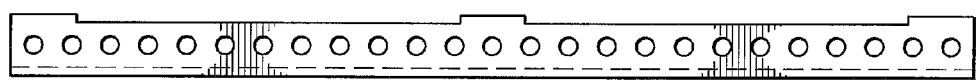
FIG. 5 is an elevational side view of a flow rail piece 110, 112 used in the inventive smoke box 18.
Figure 6:
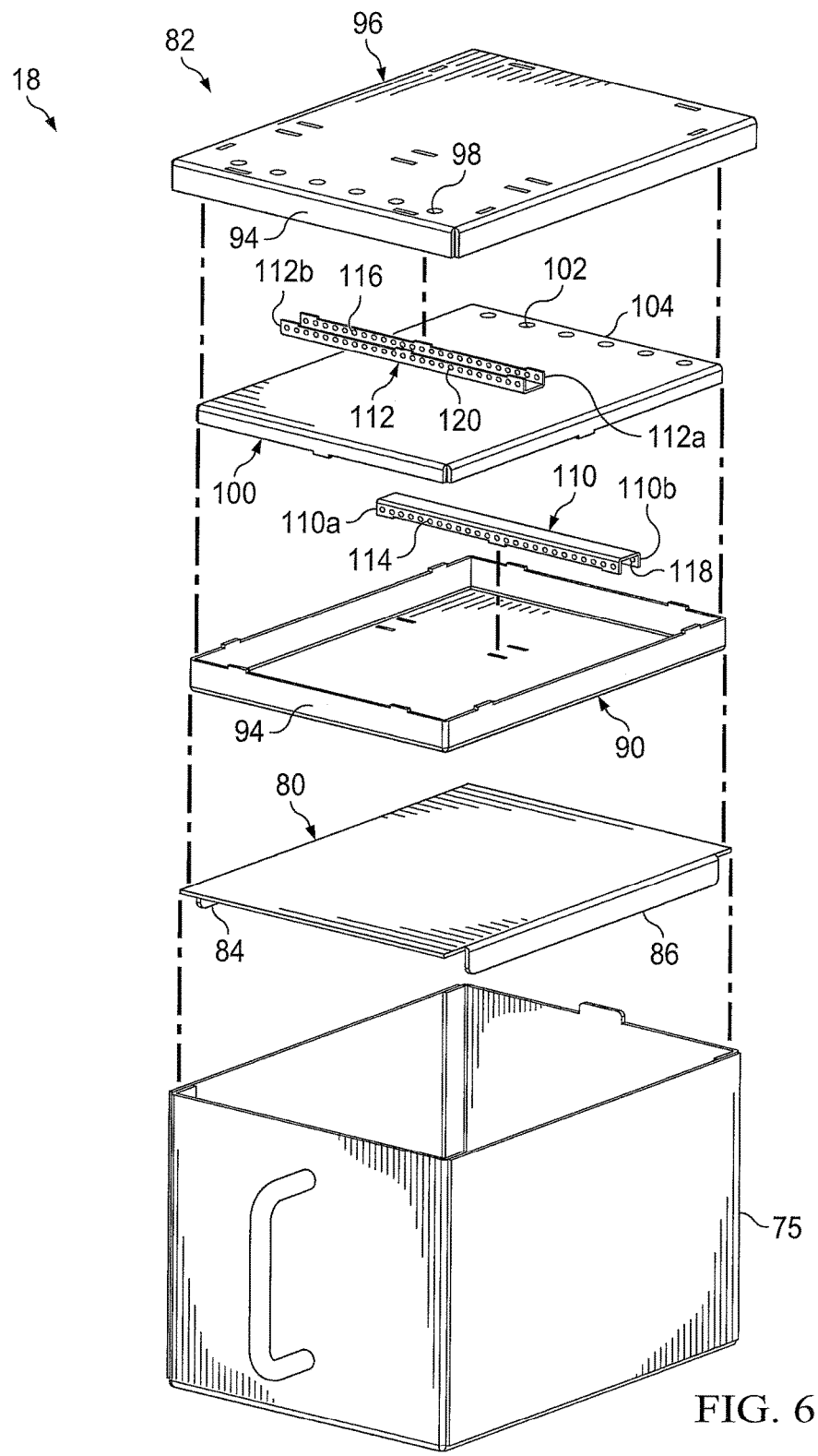
FIG. 6 is an exploded view of the inventive smoke box 18.

As seen in FIGS. 2 and 3, the location of the smoke box 18 with respect to the heating element(s) 50 is established using novel and effective features to control the heating of the wood chips or other pieces contained in the box 18. This includes a unique retaining station 55 provided on the holding tray 46 for receiving the bottom of the smoke box 18 and holding the smoke box 18 above the electric heating element(s) 50.

The retaining station 55 preferably comprises: (a) a cover plate 56 which at least partially covers the electric heating element(s) 50 and acts as a bottom plate for the retaining station 55; (b) a plurality of spacers (stand-offs) 58 projecting from the upper surface of the cover plate 56 to create an air gap 60 between the surface of the cover plate 56 and the bottom surface of the smoke box 18; (c) a receiving slot structure 65, including two short vertical side walls 62 and 64, a short vertical back wall 66, and an open front end 68, for receiving and aligning the bottom of the smoke box 18 on top of the cover plate 56; and (d) a reflector plate 70 extending rearwardly from the top of the short back wall 66 of the smoke box receiving slot structure 65 for shielding the back of the smoke box 18 from radiant energy emitted or reflect by the heating element(s) 50 and/or the reflecting surface 48.

The height of the stand offs 58 is preferable at least 0.12 inches but not more than 0.25 inches above the cover plate 56. The height of the stand offs 58 is more preferably in the range of from about 0.10 inches to about 0.14 inches. By way of example, but not by way of limitation, the cover plate 56 is preferably formed of aluminized steel, low carbon steel, stainless steel, porcelain coated de-carb steel, cast iron or cast aluminum and the stand offs 58 are preferably formed of aluminized steel, low carbon steel, stainless steel, porcelain coated de-carb steel, cast iron or cast aluminum.

As an alternative to the use of the stand offs 58, washers, screw assemblies, extruded holes, square extrusions, a plurality of elongated stand offs in receiving slot structure 65 or in the bottom of the smoke box 18, for example, could instead be used to create or provide a space between the cover plate 56 and the bottom of the smoke box 18.

In the inventive vertical electric cooking and smoking apparatus 2, the cover plate 56 which acts as shield above the heating elements 50, the spacers (stand-offs) 58 which raise the bottom of the smoke box 18 off of the cover plate 56, the spacers 54 and 57 which provide an air gap between the side of the smoke box 18 and the interior side wall of the cooking and smoking chamber 8, and the rear reflector 70 which shields the back of the smoke box 18, operate together to (a) reduce the temperature and heat transfer at the bottom of the smoke box 18 sufficiently to increase the smoke time, (b) provide even heating at the bottom of the smoke box 18 so that the entire lower layer of wood chips inside the box 18 will start at the same time, and (c) eliminate hot pockets within the smoke box 18.

The embodiment 18 of the inventive smoke generating box used in the vertical electric cooking and smoking apparatus 2 is illustrated in FIGS. 3-6. The inventive smoke box 18 comprises: a rectangular box 75 having a longitudinal axis 76; a front handle 78; a cooling plate or "false bottom" 80 which fits inside of the rectangular box 75; and a removable lid assembly 82. The false bottom 80 has a pair of downwardly extending side spacer rails 84 and 86 which support and space the false bottom 80 above the bottom 81 of the box 75 to provide and air gap 88 of from about 0.20 inches to about 0.50 inches, more preferably from about 0.33 inches to about 0.38 inches, between the false bottom 80 and the actual bottom 81 of the box 75. This additional air gap 88 within the bottom of the box 75 operates to further stabilize the heating of the wood chips or other wood pieces in the smoke box 18.

The rectangular box 75 will preferably be sized to contain at least four cups of wood chips or other pieces above the false bottom 80. The interior of the rectangular box 75 will preferably have (a) a longitudinal length in the range of from about 6.0 inches to about 6.25 inches, (b) a width in the range of from about 4.25 inches to about 4.40 inches, and (c) a height in the range of from about 3.0 inches to about 3.25 inches.

The lid assembly 82 of the inventive smoke generating box 18 comprises: (a) a lower lid piece 90 having a lateral row of smoke openings 92 which extend through the lower lid piece 90 adjacent to the forward end 94 of the lid assembly 82; (b) an upper lid piece 96 having a lateral row of smoke openings 98 which extend through the upper lid piece 96 adjacent to the forward end 94 of the lid assembly 82; (c) a middle lid piece 100 positioned between the upper lid piece 96 and the lower lid piece 90 and having a lateral row of smoke openings 102 which extend through the middle lid piece 100 adjacent to the rearward end 104 of the lid assembly 82; (d) a lower horizontal flow gap 106 formed between the lower and middle lid pieces 90 and 100; (e) an upper horizontal flow gap 108 formed between the middle and upper lid pieces 100 and 96; (f) a lower flow rail piece 110 extending laterally in the lower flow gap 106; and (g) an upper flow rail piece 112 extending laterally in the upper flow gap 108.

Each of the laterally extending lower and upper flow rail pieces 110 and 112 comprises a pair of parallel pass-through rails 110a and 110b and 112a and 112b which extend laterally across and block the upper and lower horizontal flow gaps 106 and 108. The upstream rail 110a, 112a of each rail piece 110, 112 has a series of smoke inlet holes 114, 116 provided therethrough. The downstream rail 110b, 112b of each rail piece 110, 112 has a series of smoke outlet holes 118, 120 provided therethrough. Preferably, the smoke outlet holes 118, 120 of each rail piece 110, 112 are not in alignment with the smoke inlet holes 114, 116 of the rail piece 110, 112. As a result, smoke flowing into an inlet hole 114, 116 cannot flow directly (i.e., in a straight line) through an outlet hole 118, 120 but instead is forced to change direction at least to some degree within the rail piece 110, 112.

The lower rail piece 110 is preferable positioned in the lower flow gap 106 at from about ⅓ to about ⅘, more preferably from about ½ to about ¾, of the distance from the inlet end 122 to the outlet end 124 of the lower flow gap 106. Similarly, the upper rail piece 112 is preferable positioned in the upper flow gap 108 at from about ⅓ to about ⅘, more preferably from about ½ to about ¾, of the distance from the inlet end 126 to the outlet end 128 of the upper flow gap 108.

For each of the lower, upper, and middle lid pieces 90, 96, 100, the total proportional flow area of the respective row 92, 98, or 102 of smoke openings provided therethrough will preferably be, in the range of from about 0.9 to about 2.6 inches$^2$, more preferably from about 1.3 to about 1.6 inches$^2$, per 80 in$^3$ of volume of the cooking and smoke box 18.

The lower and upper flow gaps 106 and 108 formed between the lid pieces will preferably each have a height which is in the range of from about 0.10 to about 0.17 inches, more preferably from about 0.12 to about 0.15 inches.

The total proportional flow area of the smoke inlet or outlet holes 114, 116, 118, or 120 provided through each individual upstream and downstream rail 110a, 110b, 112a, or 112b of the rail pieces 110 and 112 will preferably be in the range of from about 0.25 to about 1.0 inches$^2$, more preferably from about 0.44 to about 0.62 inches$^2$, per 80 in$^3$ of volume of the cooking and smoke box 18. For each of the rail pieces 110 and 112, the distance between the upstream rail 110a, 112a and the downstream rail 110b, 112b thereof will preferably be in the range of from about 0.25 to about 0.50 inches, more preferably from about 0.36 to about 0.40 inches.

In the inventive smoke box 18, the smoke generated by heating the wood pieces in the box 75 is forced to flow along a defined circuitous flow path 130 in which the smoke travels into the smoke openings 92 of the lower lid piece 90, through a first portion of the lower horizontal flow gap 106 to the lower rail piece 110, through the offset holes 110a and 110b of the lower rail piece, from the lower rail piece 110 to the smoke openings 102 of the middle lid piece 100, through a first portion of the upper horizontal flow gap 108 to the upper rail piece 112, through the offset holes 112a and 112b of the upper rail piece 112, from the upper rail piece 112 to the smoke openings 98 of the upper lid piece 96, and out of the smoke openings 98 into the cooking and smoking chamber 8 of the inventive vertical electric apparatus 2.

This circuitous path 130 acts as a flame suppression mechanism to prevent and contain any fire in the smoke box and additionally provides for cooling and mixing of the smoke produced in the inventive smoke box 18 so that the smoke exhausted from the lid outlet openings 98 has a relatively uniform temperature and smoke concentration. The length of the circuitous path 130 also allows for the smoke temperature to be hot enough to maintain suspension of the smoke particles in the atmosphere but cool enough to stay well below any ignition point when it exits from the smoke box 18.

Figure 7:
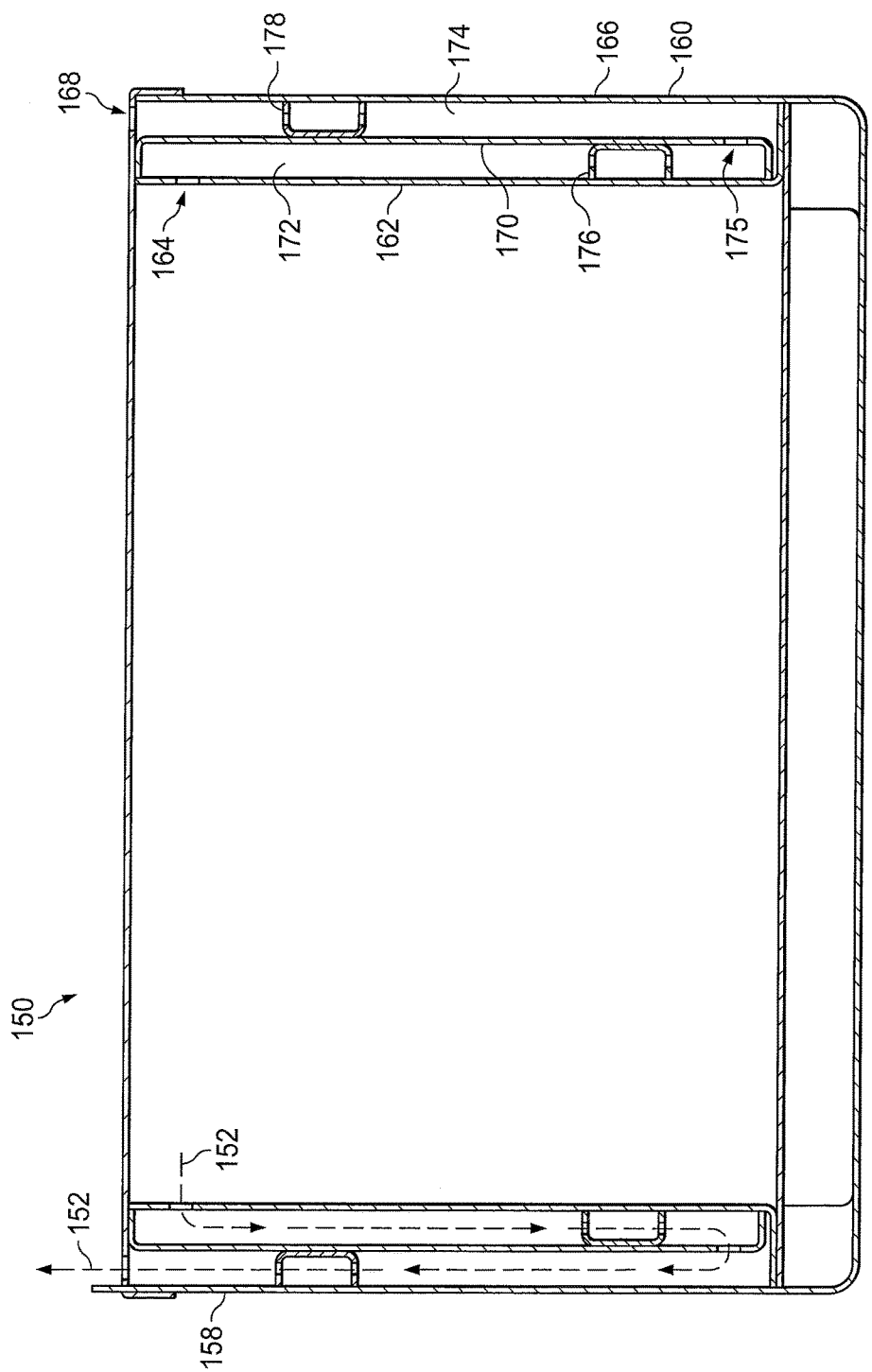
FIG. 7 is a cutaway elevational side view of an alternative embodiment 150 of the inventive smoke box.
Figure 8:
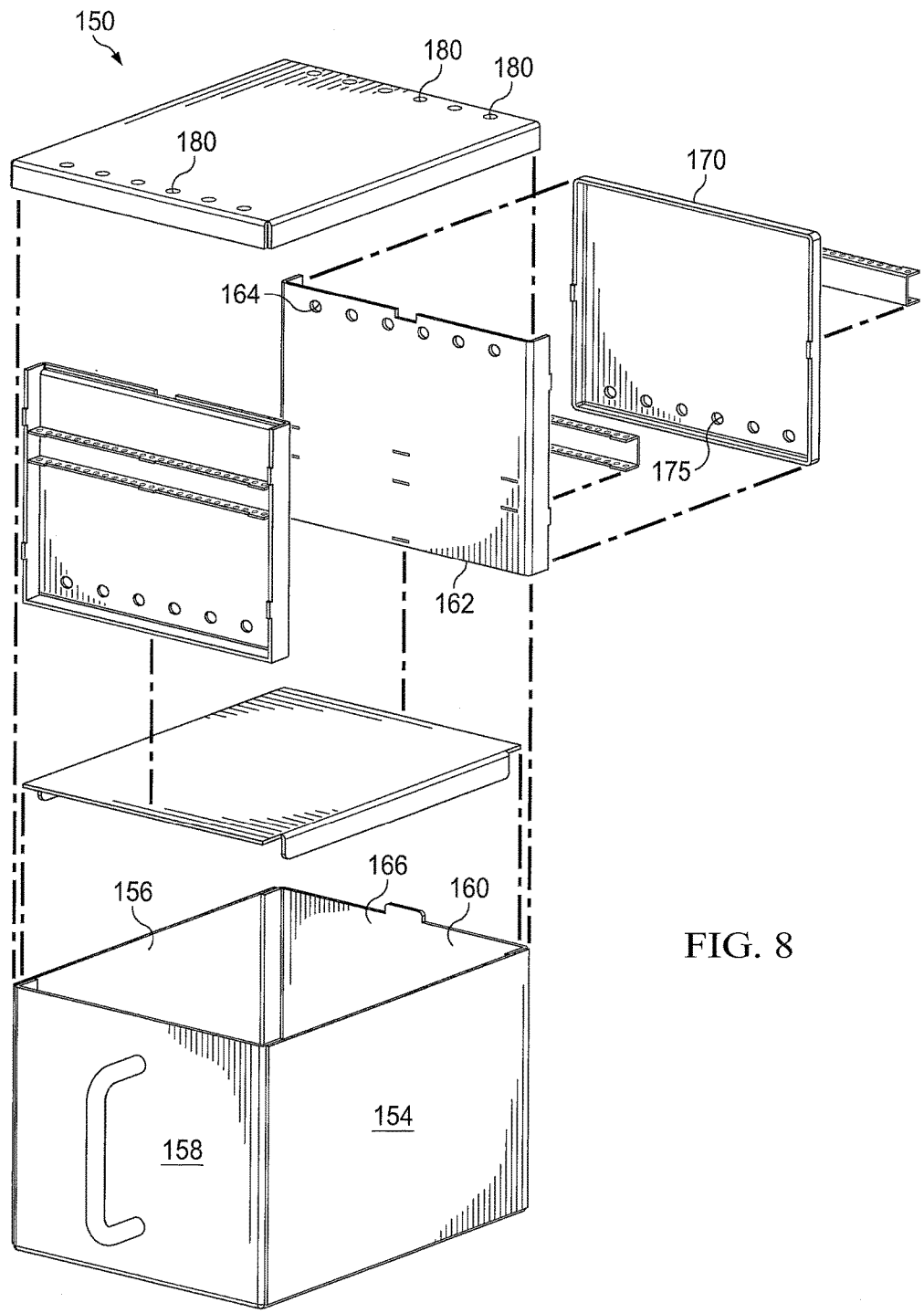
FIG. 8 is an exploded view of the inventive smoke box 150

An alternative embodiment 150 of the inventive smoke box is illustrated in FIGS. 7 and 8. The inventive smoke box 150 is substantially the same as the inventive smoke box 18 except that rather than providing the circuitous exit path for the smoke through the lid of the box, a substantially similar flow path 152 is provided in one, two, three, or all four of the vertical sides 154, 156, 158, 160 of the inventive smoke box 150.

In the inventive smoke box 150, each of the one or more vertical sides having a circuitous smoke exit path 152 provided therein comprises: (a) an inner vertical wall 162 having a row of smoke openings 164 which extend across the upper end portion thereof; (b) an outer vertical wall 166 having an open upper end 168; (c) a middle vertical wall 170 positioned between the inner and outer vertical walls 162 and 166, and having a row of smoke openings 175 which extend across the bottom portion thereof; (d) an inner vertical flow gap 172 formed between the inner and middle vertical walls 162 and 170; (e) an outer vertical flow gap 174 formed between the middle and outer vertical walls 170 and 166; (f) an inner flow rail piece 176 extending horizontally in the inner flow gap 172; (g) an outer flow rail piece 178 extending horizontally in the outer vertical flow gap 174; and (h) a row of smoke exhaust openings 180 formed through the top of the lid 182 of the box along the edge of the lid 182 for placement over the open upper end 168 of the outer vertical wall 166.

Consequently, in the circuitous flow path 152 defined in the inventive smoke box 150, the smoke is forced to flow into the smoke openings 164 at the upper end of the inner vertical wall 162, downwardly through the inner flow gap 172 to the inner rail piece 176, from the inner rail piece 176 to the flow openings at the bottom of the middle vertical wall 170, upwardly through the outer vertical flow gap 174 to the outer rail piece 178, and from the outer rail piece 178 to and out of the smoke exhaust openings 180 of the lid 182. Alternatively, the smoke could exit through side exhaust openings provided at the upper end of the outer wall 166 rather than through the lid 182.

The flow opening areas of the walls and lid, the rail piece flow opening areas, and the flow gap widths for the circuitous flow path 152 of the inventive smoke box 150 will preferably be the same as those of the flow path 130 provided in the lid assembly of the inventive smoke box 18.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the invention.

What is claimed is:

1. An apparatus for cooking and smoking food comprising:

a vertically extending cooking and smoking chamber having a left side wall, a right side wall, a back, wall, a front opening, and a bottom floor;

a door positioned on the front opening for closing and opening the front opening; and a smoke box which is received in the cooking and smoking chamber and which comprises:

a container;

an interior combustion area defined by the container for combusting woodchips or other pieces in an oxygen deficient environment to produce smoke;

a removable lid assembly configured to cover the container, including:

a lower lid piece:

an upper lid Piece:

a middle lid Piece positioned between the upper lid Piece and the lower lid Piece:

a longitudinally extending inner flow gap formed between the lower and middle lid pieces adjacent to the interior combustion area, the inner flow gap having a longitudinal upstream end portion, a longitudinal downstream end portion opposite the upstream end portion, and one or more smoke inlet openings on the lower lid piece located in the upstream end portion of the inner flow gap which are in communication with the interior combustion area to receive a smoke stream from the interior combustion area;

a longitudinally extending second flow gap formed between the middle and upper lid pieces which is parallel to and outside of the inner flow gap, the second flow gap having a longitudinal upstream end portion, a longitudinal downstream end portion opposite the upstream end portion of the second flow gap, one or more smoke inlet openings on the middle lid piece located in the upstream end portion of the second flow gap which are in communication with the downstream end portion of the inner flow gap to receive the smoke stream from the inner flow gap, and one or more smoke discharge openings on the upper lid piece located in the downstream end portion of the second flow gap to discharge the smoke stream from the second flow gap;

a lower flow obstructing rail piece in the inner flow gap; and an upper flow obstructing rail piece in the second flow gap.

2. The apparatus of claim 1 further comprising two air intake vents and two exhaust vents wherein a first of the air intake vents is provide through a lower portion of the right side wall, a second of the air intake vents is provide through a lower portion of the left side wall, a first of the exhaust vents is provided through an upper portion of the right side wall, and a second of the exhaust vents is provided through an upper portion of the left side wall.

3. The apparatus of claim 2 wherein:

the first air intake vent comprises one or a series of openings extending horizontally across at least 30% of a horizontal width of the right side wall and the second air intake vent comprises one or a series of openings extending horizontally across at least 30% of a horizontal width of the left side wall.

4. The apparatus of claim 2 wherein the first and the second air intake vents each have an open flow area in a range of from 1.0 to 4.0 inches$^2$.

5. The apparatus of claim 4 wherein the first and the second exhaust vents each have a flow area in a range of from 4.0 to 9.0 inches$^2$.

6. The apparatus of claim 5 wherein the first and the second exhaust vents each have a louvered cover.

7. The apparatus of claim 2 wherein:

the cooking and smoking chamber has an uppermost food support rack positioned therein and the first and the second exhaust vents are positioned at an elevation above an elevation of the uppermost food support rack.

8. The apparatus of claim 1 wherein the apparatus further comprises a smoke box placement station in the cooking and smoking chamber and a plurality of spacing elements which extend upwardly from a bottom plate of the smoke box placement station, the smokebox being placeable on top of the spacing elements to provide an air gap between a bottom of the smoke box and the bottom plate of the smoke box placement station.

9. The apparatus of claim 1 wherein the smoke box further comprises:

the container having actual bottom having no openings therethrough and a false bottom in the interior of the container spaced above the actual bottom of the container such that a bottom air space is defined in the container between the false bottom and the actual bottom of the container, the false bottom having no openings therethrough.

10. The apparatus of claim 1 wherein the lower flow obstructing rail piece comprises a flow obstructing rail which extends laterally in the inner flow gap at a longitudinal location between the upstream end portion and the downstream end portion of the inner flow gap and which has a series of holes therethrough for flow of the smoke stream through the flow obstructing tail in the inner flow gap and the upper flow obstructing rail piece comprises a flow obstructing rail which extends laterally in the second flow gap at a longitudinal location between the upstream end portion and the downstream end portion of the second flow gap and which has a series of holes therethrough for flow of the smoke stream through the flow obstructing rail in the second flow gap.

11. The apparatus of claim 10 wherein the flow obstructing rail in the inner flow gap is an upstream flow obstructing rail, the lower flow obstructing rail piece comprises a downstream flow obstructing rail, which extends laterally in the inner flow gap downstream of, and parallel to, the upstream-flow obstructing rail and has a series of holes therethrough which are not in alignment with the holes of the upstream flow obstructing rail, the flow obstructing rail in the second flow gap is an upstream flow obstructing rail and the upper flow obstructing rail piece comprises a downstream flow obstructing rail which extends Literally in the second flow gap downstream of, and parallel to, the upstream flow obstructing rail in the second flow gap and has a series of holes therethrough which are not in alignment with the holes of the upstream flow obstructing rail in the second flow gap.

12. The apparatus of claim 11 wherein:

the upstream and downstream flow obstructing rails in the inner flow gap are spaced a longitudinal distance of from 0.25 to 0.5 inch apart.

* * * * *

UNITED STATES PATENT AND TRADEMARK OFFICE
CERTIFICATE OF CORRECTION

PATENT NO. : 10,426,176 B2
APPLICATION NO. : 15/075813
DATED : October 1, 2019
INVENTOR(S) : William A. Dixon, Sleiman Assaad Adallah and Mark Stephen McQuagg It is certified that error appears in the above-identified patent and that said Letters Patent is hereby corrected as shown below:

In the Claims

Claim 1, Column 11, Lines 15-17: change "Piece" to "piece"

Claim 2, Column 11, Lines 51 and 52: change "provide" to "provided"

Claim 11, Column 12, Line 56: change the word "Literally" to "laterally"

Signed and Sealed this
Twenty-sixth Day of November, 2019

Andrei Iancu
*Director of the United States Patent and Trademark Office*